July 28, 1942.   R. H. GOLDE ET AL   2,291,468
PROTECTIVE DEVICE FOR ELECTRICAL CIRCUITS
Filed Jan. 10, 1940
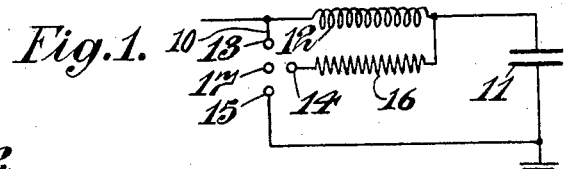
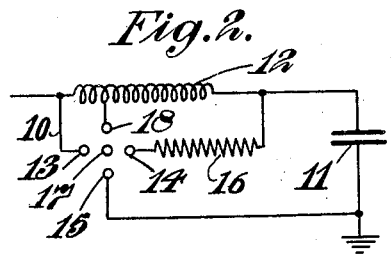
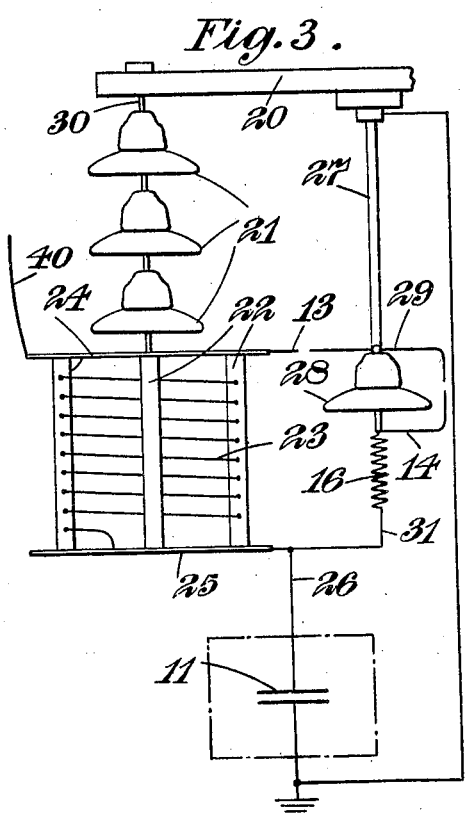
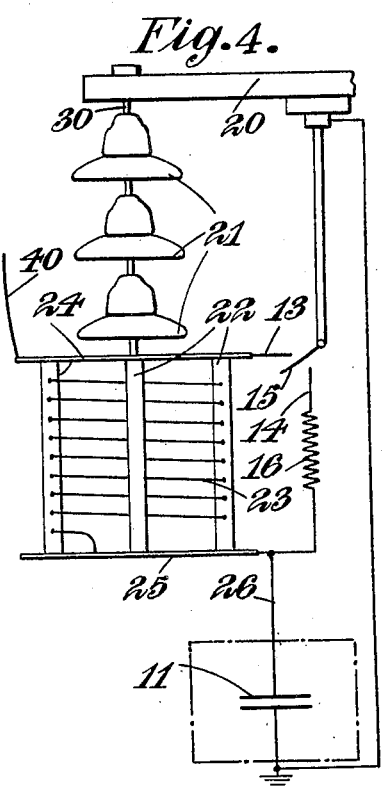
Rudolf Heinrich Golde
Harold Morgan Lacey
William George Hawley
Walter Withercot
by their attys — Stebbins, Blenko & Parmelee Patented July 28, 1942

2,291,468

UNITED STATES PATENT OFFICE 2,291,468

PROTECTIVE DEVICE FOR ELECTRICAL CIRCUITS

Rudolf Heinrich Golde, Harold Morgan Lacey, William George Hawley, and Walter Nethercot, London, England, assignors to E. R. A. Patents Limited, London, England, a British company Application January 10, 1940, Serial No. 313,236 In Great Britain June 14, 1939

3 Claims. (Cl. 175—30)

This invention relates to protective devices for electrical circuits such as power-transmission systems.

According to the invention, a protective device for an electric circuit comprises an inductance in parallel with two electrodes of a discharge gap and in series with the circuit to be protected, whereby the time-lag of the gap is reduced, a third electrode of the discharge gap being connected to earth.

Specific embodiments of the invention will now be described, by way of example, with reference to the accompanying drawing in which:

Figures 1 and 2 are diagrams of various forms of the protective device according to the invention, Figure 3 shows a constructional form of the invention, Figure 4 being an alternative arrangement to that of Figure 3.

As shown in Figure 1 of the accompanying drawing, an overhead transmission line 10, where it enters a substation indicated as a capacitor 11, has an inductance 12 connected in series. The two ends of the inductance are connected to the electrodes 13 and 14 of a four-electrode air-gap, a third electrode 15 of which is connected to earth as shown. The electrode 14 is connected to the substation side of the inductance through a resistance 16. The first and third electrodes 13, 15, are arranged on either side of a fourth electrode 17, the electrode 14 lying opposite the electrode 17. The electrode 17 merely acts as a bridge to increase the total length of air-gap between the inductance 12 and earth.

When a surge occurs which is of sufficient amplitude to break down the gap, the inductance and the resistance, which will then be parallel with one another with respect to current flowing through the line, constitute a surge absorber and will have to deal only with very short waves. Until the incoming surge has reached a value sufficient to break down the gaps between the electrodes 13 and 17, and 17 and 14, only the inductance is in circuit with the line and operates with maximum efficiency upon the first part of the wave. When the gaps break down the resistance is in parallel with the inductance as above described.

On the arrival of a surge a large portion of the voltage appears across the inductance; thus the gaps between the electrodes 13 and 14 break down promptly whereby the time-lag of the entire gap is reduced.

In the alternative arrangement of Figure 2 the electrodes 13, 14 and 15, and an electrode 18 connected to a tapping of the inductance 12 may be grouped around the bridging electrode 17. Alternatively two separate inductances may be provided, connected together in series, the electrode 18 being connected to a point between them. This arrangement has the advantage that a breakdown voltage is rapidly built up across the turns of the inductance first encountered by the incoming surge so that breakdown between the gap-electrodes 13, 17, 18 occurs rapidly whereby the time-lag of the entire gap is reduced.

In any of the different forms of the invention described above the portion of the air-gap which discharges to earth may be replaced by or supplemented by any known form of lightning arrester, expulsion gap or resistance.

The value of the inductance used will depend upon the conditions in which the protective device is required to operate. As applied to a device for protecting a substation from surges in an overhead transmission line values of from 0.4 to 10 millihenries have been found to give satisfactory results. A resistance of from 500 to 1000 ohms is suitable for use with an inductance of from ½ to 1 millihenry.

One constructional form of the apparatus is shown in Figure 3, as applied to the protection of apparatus in a substation against surges of steep wave-front in an overhead transmission line. A gantry 20 supports, by means of post-type or suspension-type insulators 21, a wooden frame 22 on which is wound an inductance coil 23. Top and bottom conducting plates 24 and 25 carried by the frame 22 are connected respectively to the two ends of the coil 23. The lead-in 40 is also connected to the top-plate 24 and the bottom plate 25 is connected by a conductor 26 to the substation, which is again represented by a capacitor 11. The gantry 20 also supports an expulsion-gap 27 of the known type comprising a tube coated on the inside with material which volatilises when the gap discharges. From the lower end of the expulsion-gap 27 an insulator 28 is suspended and carries a resistance 16 which is connected by a conductor 31 to the plate 25 and to the substation 11.

The lower end of the expulsion-gap 27 carries a conductor 29 which projects on one side towards a rod-electrode 13 carried by the plate 24 and on the other side to co-operate with an electrode 14 connected to the upper end of the resistance 16. It will be seen that the conductor 29 plays the part of the bridging electrode 17 of Figure 1, that the top end of the gap 27 is the counterpart of the electrode 15, and that the circuit is, in other respects also, identical with that of Figure 1.

In the alternative arrangement of Figure 4 the electrodes 13 and 14 may be carried by the frame 22 and the electrode 15 may be constituted by a rod connected to the bottom end of the expulsion-gap 27 and inclined so as to conform, or approximately conform, to an arc of a circle concentric with the point of connection 30 of the insulators 21 to the gantry 20. Thus, slight swinging movements of the frame 22 about the point of suspension 30 do not cause any change in the lengths of the gaps 13—15 and 14—15. A further advantage of the arrangement of Figure 4 is that the insulator 28 is not required.

We claim:

1. A protective device for an electric circuit comprising a discharge gap composed of four electrodes grouped around a fifth, which is itself not connected to any other part, an inductance in series with the line to be protected and connected at one end to one of said four electrodes and at the other end through a resistance to another of said electrodes, and a tapping between the ends of the inductance connected to a third of said electrodes, the fourth electrode being earthed.

2. A protective device for an electric circuit, comprising an inductance in series with the circuit, a multi-electrode discharge gap comprising at least three electrodes of which a first electrode is connected directly to the inductance at the line end of it, a second electrode is connected permanently to earth, and a third electrode is connected by means of a resistance and an additional air-gap in series to the other end of said inductance, the third electrode lying between the first two electrodes so as to form two air-gaps, such that, when the said gaps break down, the resistance lies in parallel with the inductance which remains in series with the line and the line is connected directly by said gaps to the earthed electrode.

3. A protective device as claimed in claim 2, wherein the said additional air-gap is disposed between the said resistance and the said third electrode.

RUDOLF HEINRICH GOLDE.
HAROLD MORGAN LACEY.
WILLIAM GEORGE HAWLEY.
WALTER NETHERCOT.